3,387,613
PROCESS AND APPARATUS FOR CLEANING
PLANT LEAVES
Carl M. McHugh, Clemson, S.C., assignor to Research
Corporation, New York, N.Y., a non-profit corporation
of New York
Filed Aug. 25, 1966, Ser. No. 575,013
16 Claims. (Cl. 131—138)

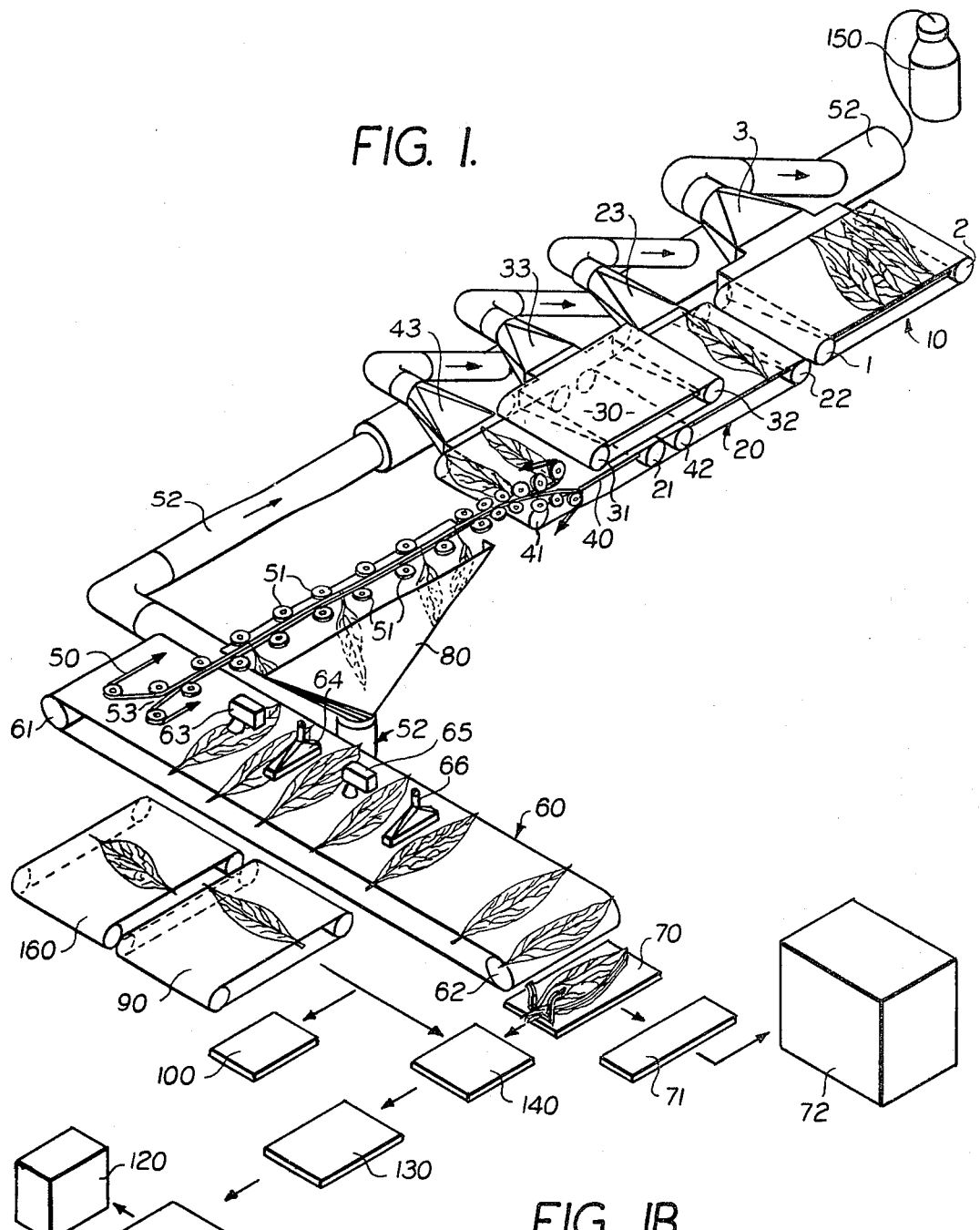
FIG. I.
FIG. IB.
INVENTOR
CARL M. McHUGH
BY 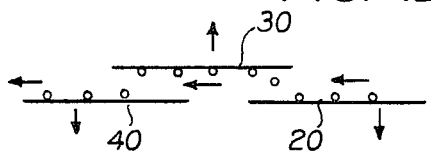
ATTORNEY.

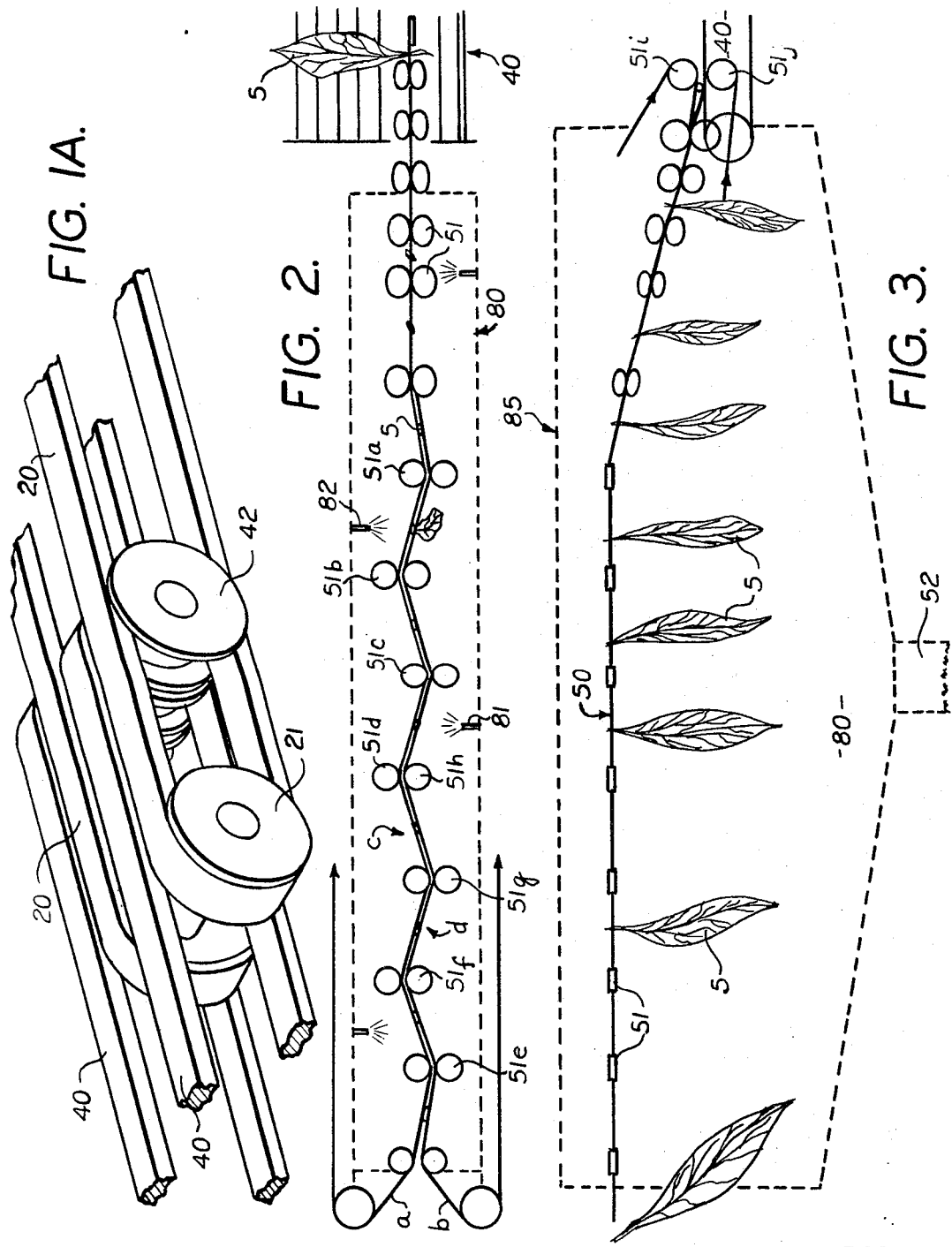

The present invention is broadly concerned with an improved process and apparatus for cleaning and upgrading plant leaves, particularly tobacco plant leaves. The invention is more especially concerned with an improved technique for processing cured tobacco leaves by a processor of the tobacco which is received in bulk form from the producer or grower of the tobacco.

In accordance with the present invention, foreign undesirable materials, such as dirt, sand, string, feathers, and the like, in cured tobacco, are effectively and efficiently completely removed from leaves before being delivered to the market, by a unique integrated process and apparatus. The present invention constitutes an improvement over the process described in Patent No. 3,252,466, granted May 24, 1966, inventor Swink, entitled, "Apparatus and Process for Cleaning Plants."

In the present invention, the leaves, such as tobacco leaves, are passed along conveyors where in an initial stage the leaves are in a substantially horizontal position as they are being treated. While passing along these initial conveyors, a number of operations are adapted to remove substantial quantities of deleterious materials therefrom. In one specific adaptation of the present invention, the leaves after passing along initial processing conveyors, are in a final cleaning stage attached by the stem to a conveyor, such as a round belt conveyor, which permits the full leaf to drop or position itself in a vertical position, stem up, as it passes through the final cleanup stage or area.

The construction of the belt conveyor or equivalent means preferably is such so as to secure a serpentine movement which causes the leaves to flex and move in different and various directions, thus loosening and freeing the final traces of foreign material from their surfaces. Also, it is preferred to utilize jets of air which impinge against the leaves from the sides of the frame which air jets further agitate the leaves in a controlled manner and function to remove the final traces of the foreign materials from the leaves. This foreign material falls to the bottom of the cleansing area and is removed by suitable means, preferably by suction.

The process and apparatus of the present invention may be readily understood by reference to the drawings illustrating some embodiments of the same. FIGURES 1, 1A and 1B illustrate an overall diagrammatic operation. FIGURE 2 is atop view of the final cleansing zone and illustrates in some detail the serpentine movement of the belt conveyor while FIGURE 3 is a side view of the apparatus illustrated in FIGURE 2 with a collecting tank shown in broken lines.

Referring specifically to FIGURE 1, cured tobacco delivered by the producer is placed upon an initial belt conveyor 10 supported by suitably driven rolls 1 and 2, as illustrated. This conveyor may be a wire mesh type of conveyor, as illustrated in the identified Swink patent, but is preferably a gang belt, such as V belt, assembly whereing, for example, each V belt is spaced about one inch apart, each supported on a sheave which, in turn, are on a common axle. Belt conveyor 10 may be agitated, and an underside vacuum is imposed by means of duct 3 and suitable auxiliary equipment, not shown, so as to remove the displaced deleterious particles from the leaves.

The leaves then pass from initial belt conveyor 10 and drop to a secondary belt conveyor 20 which is preferably positioned below the height of belt conveyor 10. This causes the leaves to drop and thus a shock is imparted to them resulting in displacement of particles therefrom. Belt conveyor 20 has a higher linear velocity than belt conveyor 10 so as to initiate separation of the leaves one from the other. Belt conveyor 20 moves around rollers or a plurality of sheaves 21 and 22. Belt conveyor 20 likewise may be suitably agitated or otherwise moved so as to secure maximum loosening and removal of the undesirable particles. These loosened particles are removed by means of air-vacuum duct 23. Here again, the vacuum is imposed on the underside of the leaves.

The leaves are passed from conveyor 20 to a tertiary overhead conveyor 30 supported by rolls or sheaves 31 and 32. A vacuum is imposed on the topside by means of duct 33 which pick up the leaves from conveyor 20. The conveyor system is designed to impose no underside vacuum between rollers 21 and 42. The belts of conveyor 20 and conveyor 30 are spaced vertically apart about ½". This vertical spacing may be varied as a function of other operating and apparatus features as, for example, from about ¼" to 1" etc. As mentioned, conveyor 30 picks up the leaves from the top sides and causes foreign material to be removed from the top surfaces of the leaves and carried off through duct 33. The leaves are then passed onto a fourth conveyor 40 supported by rollers or sheaves 41 and 42 under the force of gravity and an underside suction created by duct 43 and suitable auxiliary means. When the leaves are transferred from overhead conveyor 30 to conveyor 40 the top side vacuum through duct 33 is cut off. This lifting and dropping of the leaves between the respective conveyors loosens and removes most of the foreign matter from the leaves.

Conveyor 20 has a linear velocity greater than that of conveyor 10 and likewise conveyor 30 has a linear velocity greater than conveyor 20. Increasing the linear velocity of each succeeding conveyor increases the separation of the leaves. Conveyor 20 is at the same height as conveyor 40 and the belts intermesh as illustrated in FIGURE 1A. Referring specifically to FIGURE 1A gang sheaves 21 supports one end of conveyor 20 along with gang sheave 22, not shown. Oversize slots in sheave 21 permit conveyor 40 to move freely thereby. Gang sheave 42 supports conveyor 40 along with sheave 41 not shown. Oversize slots in sheave 41 permit conveyor 20 to move freely thereby. No underside vacuum is imparted between sheaves 21 and 42. Thus, in this area the vacuum imparted through duct 33 will cause the leaves to be picked up by conveyor 30 as hereinbefore described. This intermeshing of the respective conveyors 20, 30 and 40 functions very effectively to secure the smooth conveyance of the leaves and to very effectively remove deleterious particles therefrom. The structure is illustrated in FIGURE 1B.

In accordance with the specific adaptation of the present invention, the leaves, as they move along belt conveyor 40 supported by sheave 41 and sheave 42, are picked up by the stem by a round belt conveyor 50 passing between suitably arranged and supported roller elements 51. These belts of this fifth conveyor unit may be of any configuration but are preferably round.

Since the leaves are picked up at the ends of the stems, the leaves, as they pass off belt conveyor 40, fall downwardly into a substantially vertical position. These belts or conveyor 50 with the leaves pass through a final cleaning area or zone 80. The leaves, as they pass through this final cleaning area 80, are preferably agitated by positioning the rollers 51 out of straight alignment as hereinafter described. The leaves in zone 80 are also, preferably, further agitated by jets of air impinging on them causing them to sway more vigorously and jerkily. This combined treatment completely frees the leaves of undesirable particles. A vacuum is drawn through conduit 52 causing the particles to fall downwardly in zone 80 and to be removed as illustrated through conduit or duct 52 into cyclone 150 along with particles removed through ducts 3, 23, 33 and 43.

The agitation and separation of the leaves cause bits of the tobacco leaf to be loosened and drawn into the respective ducts where they are carried with the removed foreign matter, into a cyclone 150. Here the bits of tobacco are recovered by suitable means and sacked for industry.

The stems of the leaves are released at point 53 where section (a) of belt 50 separates from section (b) of belt 50. Since the stem is more dense than the rest of the leaf and since the respective heights of conveyors 50 and 60 are so adjusted to have the tip of the leaf strike the edge of the lower positioned conveyor 60 operating at a right angle to conveyor 50, the leaf will fall in a manner that its longitudinal axis is substantially parallel to the direction of movement when released from conveyor 50 at point 53.

Grading of the leaves is accomplished by suitable means along conveyor 60 which is supported by rollers 61 and 62. As the leaves pass along conveyor 60, color-sensitive photoelectric control cells 63 and 65 function to grade the leaves and to activate suction lift elements 64 and 66 which pick out and segregate or grade less desirable leaves. These leaves are passed to secondary units 160 and 90 by suitable means while the top grade uniform leaves are gathered at zone 70. The leaves gathered at zone 70 pass to a baling zone 72. If desired, a moisture control zone as shown at 70, may be utilized before the graded leaves are packed for shipment. Here the moisture content of the leaves may be adjusted upwardly or downwardly to an optimum condition so as to minimize cracking and breakage of the leaves in transit on the one hand, and dampness and mold on the other hand. Leaves gathered in zones 160 and 90 may be passed to a tying zone 140, thence to a bundling zone 130, thence to an optional moisture control zone 110, and finally to storage zone 120. The leaves also may be passed directly to a baling zone 100 and handled as desired.

Referring specifically to FIGURE 2, elements similar to FIGURE 1 are similarly numbered. The leaves pass from the belt conveyor 40 and are picked up by means of conveyor belt 50 comprising two round belts (a) and (b). These belts or conveyor 50 pick up the leaves 5 by their stems. As the leaves move into zone 80 they fall to a vertical position with the broad leaf down. The contacting belts containing the stems of the leaves 5 pass between roller elements 51.

It is preferred that some of the supporting rollers 51 be out of alignment so as to secure a serpentine movement of the conveyor 50 as it passes through zone 80. This causes the leaves to weave and flex to and fro as they move through zone 80. The extent to which these rollers are out of alignment may be varied appreciably depending upon the degree of agitation desired which will be a function of various factors, such as velocity of belts, the force and direction of the air streams, etc.

It is to be noted that the axes of the rollers 51*i* and 51*j* supporting conveyor 50 at the point of picking up the leaf from conveyor 40 are in horizontal planes. (See FIGURE 3.) The axes of successive pairs of supporting rollers 51 gradually revolve until at point 85 in zone 80 they lie in vertical planes. From point 85 on all the rollers are in the same horizontal plane. However, the axes of the rollers supporting one side of the belt 50 are preferably not in the same vertical plane. One preferred technique or arrangement is to have alternate rollers supporting one side of the conveyor on opposite sides of a vertical plane, preferably abutting the same. This is shown with respect to rollers 51*a*, 51*b*, 51*c*, 51*d* and vertical plane (c). It is also shown with respect to rollers 51*e*, 51*f*, 51*g*, 51*h* and vertical plane (d). Obviously, the rollers may be irregularly staggered if so desired.

Thus it is seen that my process and apparatus covers an initial or primary horizontal cleaning stage and a secondary vertical cleaning stage, and that the initial stage is formed of a two-step first phase, a second phase, and a third phase, and the secondary stage has only the single phase.

In accordance with a preferred adaptation, optional air jets 81 and 82 are utilized so as to strike the vertically hanging leaves and by direct force of the blasts of air to cause the more securely held foreign material to be disengaged from the leaf. Thus, the invention is concerned with a novel technique and apparatus for effectively and efficiently removing all deleterious particles from leaves particularly tobacco leaves.

What is claimed is:

1. Process for the removal of deleterious particles from plant leaves which comprises positioning said leaves in a horizontal position with the stems extending in the same direction in an initial stage and subjecting the same to agitation and vacuum conditions between superimposed belt type conveyors in said initial stage for dislodging and removing said particles from the leaves, thereafter substantially vertically positioning the leaves, stem up, in a secondary stage, subjecting the leaves to agitation and vacuum in said secondary stage and completely removing remaining particles therefrom.

2. Process as defined by claim 1 wherein the leaves as they emerge from said secondary stage are caused to fall into a horizontal position and are passed through a tertiary stage wherein the same are graded as they pass therethrough.

3. Process as defined by claim 2 where said leaves are positioned to fall so as to have the longitudinal axis of the same substantially parallel to the direction of movement when said leaves emerge from said second stage.

4. Process as defined by claim 1 wherein in said initial stage the leaves are subjected to under-surface vacuum in a first phase, and thereafter raised up by an upper-surface vacuum in a second phase and thereafter dropped down by means of an under-surface vacuum in a third phase.

5. Process as defined by claim 1 wherein said agitation in said secondary stage is secured by moving the leaves therethrough in a serpentine movement.

6. Process as defined by claim 5 wherein said agitation is further secured by impinging air on said leaves as they pass therethrough.

7. Process as defined by claim 1 wherein said leaves are tobacco and wherein in said initial stage the leaves are subjected to an under-surface vacuum in a first phase, are picked up in a second phase by means of a top-surface vacuum and are dropped down in a third phase by means of an undersurface vacuum, and wherein in said secondary stage said leaves are agitated by means of passing the leaves therethrough in a serpentine fashion thereby causing the lower broad leaf to flex and weave resulting in complete removal of undesirable particles.

8. Process as defined by claim 7 wherein the leaves are jerkedly flexed by means of air jets impinging thereon in said secondary stage.

9. An apparatus assembly for the removal of deleterious particles from plant leaves which comprises in combination, (1) a plurality of first horizontal conveyors positioned in a first particle removing and processing zone, (2) vacuum means along said conveyors in said first processing zone for subjecting the leaves positioned horizontally on said conveyors to vacuum pressures as they move therethrough, (3) a conveyor positioned in a second processing zone at the end of said first conveyors for picking up and suspending the leaves by their stems as they emerge from said first processing zone and holding the broad areas of said leaves so they will fall downwardly as they move through said second particle removing processing zone whereby the remaining deleterious particles will fall therefrom.

10. Apparatus as defined by claim 9 wherein there is also in combination, (4) a conveyor positioned in a third processing zone for picking up the leaves as they emerge from the end of said second processing zone, and (5) grading means positioned along said conveyor in said third processing zone for grading the leaves as a function of quality of said leaves.

11. Apparatus as defined by claim 9 wherein said plurality of conveyors in said first processing zone comprises, (a) a first conveyor and vacuum means associated therewith to provide a vacuum on the undersurface of said leaves, (b) a second conveyor positioned above said first conveyor and over-extending said first conveyor and vacuum means associated therewith so as to impose vacuum on the top surface of said leaves and functioning as an overhead conveyor for said leaves, and (c) a third conveyor positioned below said second conveyor and under-extending said second conveyor and vacuum means associated therewith to impose an under-surface vacuum on said leaves whereby as said leaves move from said first conveyor to said second conveyor they will move upwardly and as the leaves move from said second conveyor to said third conveyor they will move downwardly.

12. Apparatus as defined by claim 11 wherein said first conveyor and said third conveyor are gang belt conveyors and wherein the exit ends of the belts of said first conveyor intermesh with the pickup ends of the belts on said third conveyor.

13. Apparatus as defined by claim 12 wherein no undersurface vacuum is imposed in the area wherein said belts intermesh.

14. Apparatus as defined by claim 9 wherein said conveyor in said second processing zone is supported by roller elements in an alignment designed to cause said conveyor to move in a serpentine movement as it moves through said second processing zone, thereby causing the unsupported broad ends of said leaves to wave and flex as they move through said second processing zone.

15. Apparatus as defined by claim 14 wherein air jets are supported in said second processing zone and in alignment to impinge on said leaves as they move therethrough.

16. Apparatus as defined by claim 10 wherein said conveyor in said third processing zone is positioned at substantially right angles to the conveyor in said secondary zone and is also positioned below said conveyor in said secondary zone at sufficient distance so that the tips of the leaves will impinge on said conveyor as the stems are released from the conveyor in said secondary zone, thereby causing the leaves to fall in a horizontal position on said conveyor in a third processing zone wherein the longitudinal axis of the leaves is substantially parallel to the direction of movement of the leaves when they are released from the conveyor in said secondary zone.

References Cited

UNITED STATES PATENTS

| 1,808,794 | 6/1931 | Stelzer | 131—110 |
|---|---|---|---|
| 1,862,192 | 7/1932 | Michaux | 31—149 |
| 1,993,857 | 3/1935 | Quester | 131—149 X |
| 1,999,490 | 4/1935 | Van Huystee | 131—57 |
| 3,036,578 | 5/1962 | Molins | 131—84 |
| 3,039,474 | 6/1962 | Korber | 131—84 |
| 3,252,466 | 5/1966 | Swink | 131—138 |

FOREIGN PATENTS

| 236,008 | 1/1945 | Switzerland. |
|---|---|---|
| 534,613 | 9/1931 | Germany. |
| 539,061 | 1931 | Germany. |
| 1,163,715 | 2/1964 | Germany. |
| 601,274 | 1/1960 | Italy. |
| 130,820 | 12/1959 | U.S.S.R. |

ALDRICH F. MEDBERY, *Primary Examiner.*